No. 667,674. Patented Feb. 12, 1901.
G. F. BUTTERFIELD.
MACHINE FOR APPLYING RUBBER SOLES TO BOTTOMS OF LEATHER BOOTS OR SHOES.
(Application filed May 19, 1900.)
(No Model.) 2 Sheets—Sheet 2.
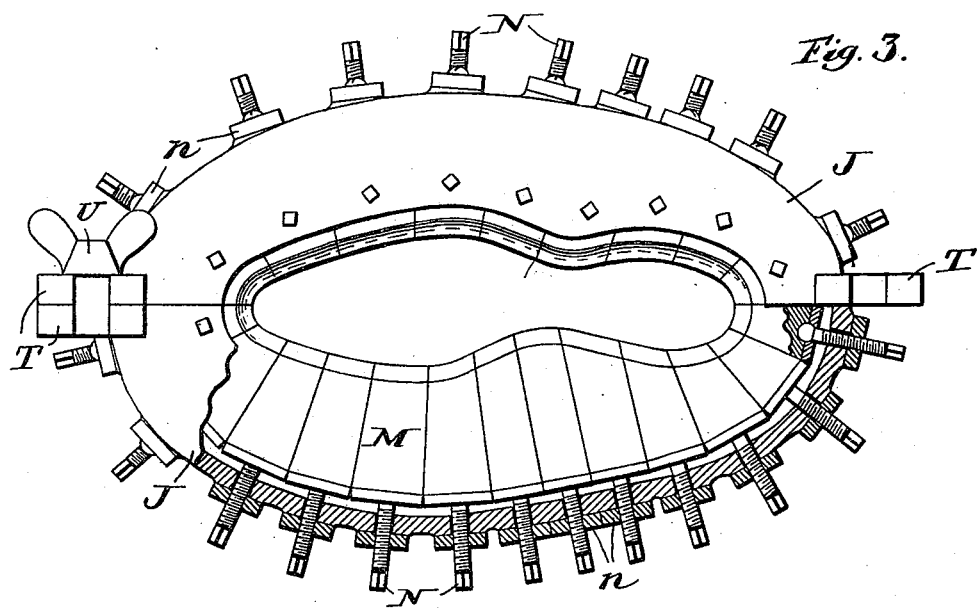
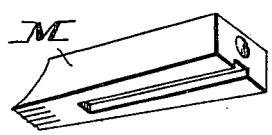
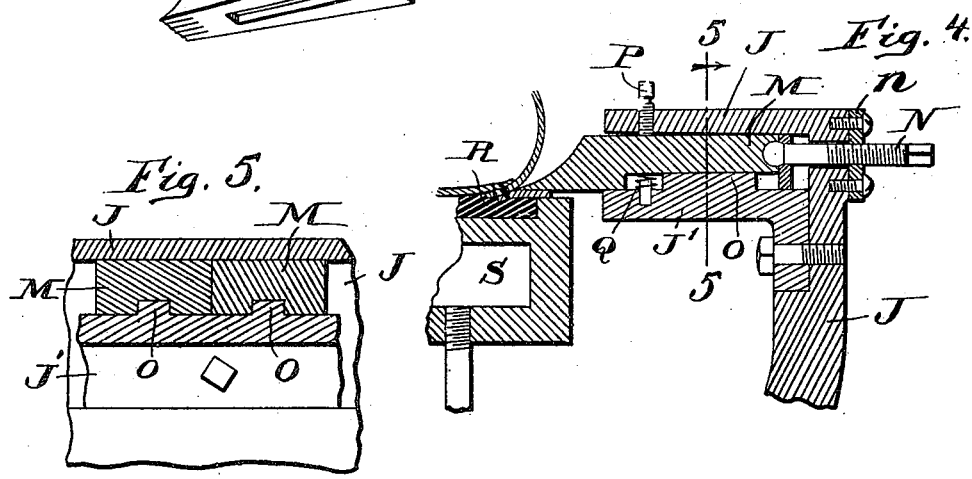
Witnesses:
Charles F. Logan.
Margaret C. Power.
Inventor:
George F. Butterfield
by A. N. Spencer, Atty

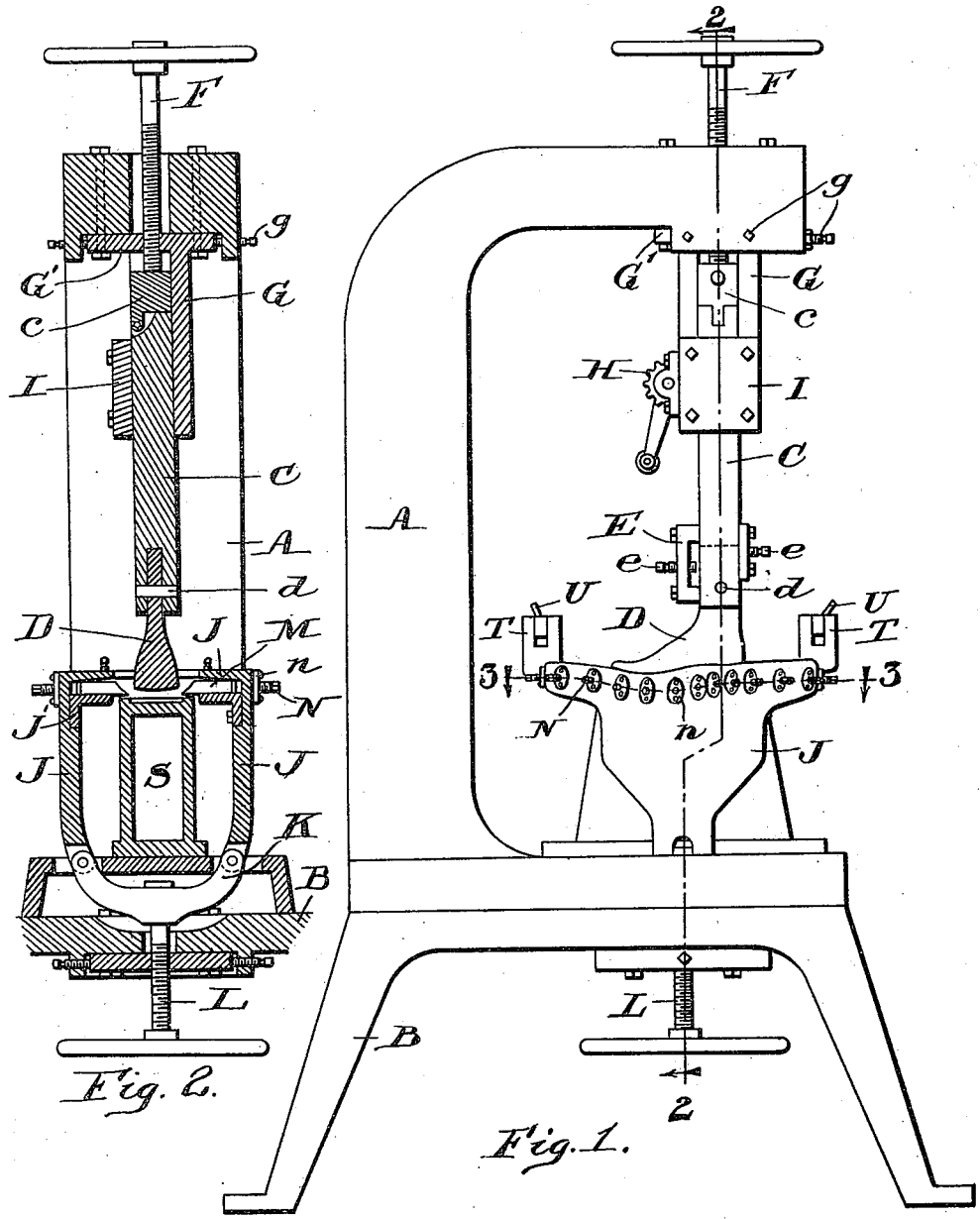

UNITED STATES PATENT OFFICE.

GEORGE F. BUTTERFIELD, OF FRAMINGHAM, MASSACHUSETTS.

MACHINE FOR APPLYING RUBBER SOLES TO BOTTOMS OF LEATHER BOOTS OR SHOES.

SPECIFICATION forming part of Letters Patent No. 667,674, dated February 12, 1901.

Application filed May 19, 1900. Serial No. 17,188. (No model.)

*To all whom it may concern:*

Be it known that I, GEORGE F. BUTTERFIELD, of Framingham, in the county of Middlesex and State of Massachusetts, have invented certain new and useful Improvements in Machines for Applying Rubber Soles to the Bottoms of Leather Boots or Shoes, of which the following is a specification.

The object of this invention is to provide improved mechanism for applying and vulcanizing rubber soles or soles and heels to the bottoms of leather shoes.

My improvement relates to certain features of the machine by which the shoe is held in place over the mold containing the rubber compound to constitute the rubber sole and to certain peculiarities and special features of adjustability in the mold pertaining to such machine, so that these rubber soles may be applied to shoes of different sizes and widths.

The rubber sole is applied and vulcanized to shape in the sole-shaped mold or die formed in the upper surface of a steam-chamber through which steam is caused to pass, as described in various patents granted to me. The shoe to which the sole is to be applied is mounted on a last or form connected to a vertically-movable shaft of the machine, so that the shoe may be held in the exact position required over the die and with pressure upon the rubber therein. The means of adjusting these pressure devices are part of my present invention, together with a rack and pinion for lifting the shoe and lower portion of the shaft when the main pressure-screw has been slackened and the block forming part of the shaft has been turned aside to permit the raising of the shaft. The shaft and connected parts hold the shoe proper in position during vulcanization and raise it for removal of the shoe; but other devices are necessary to hold and shape the edges at the line of the welt. Such additional devices constitute a second part of my invention. In my United States Letters Patent No. 627,840, dated June 27, 1899, means were set forth for holding down the welt and edges of the sole upon the rubber compound in the mold, such devices comprising a pair of hinged clamps operated by a pressure-screw beneath them to draw downwardly such clamps upon the welt on opposite sides of the shoe. Each clamp conforms edgewise to the edge of the shoe, along the line of junction of the welt and upper, from toe to heel. It is, however, very desirable to employ a given machine adapted for several sizes and widths of shoes. I therefore under my present improvements provide each clamp with a series of adjustable fingers capable of movement toward or from the last or shoe sufficient to adjust the apparatus to various sizes. These adjustable fingers are beveled or tapered at their inner ends to enter the narrowing space between the upper leather and the upper face of the welt, with a flat or grooved under surface to press downwardly on the welt. Each finger is separately adjusted toward and from the shoe by an adjustable screw, and each finger is recessed or grooved on its under side to receive a guide-rib which holds it in a central position, but permits its longitudinal movement. Each finger is also provided with a pressure-screw by which its proper pressure on the welt is maintained, the relieving-spring beneath it serving to relax the pressure when desired. When once adjusted to a given size and width of shoe, the several fingers need not be again adjusted, but all are together relaxed or tightened by movement of the clamp-screw of the machine.

In the drawings, Figure 1 is a side elevation of my improved machine. Fig. 2 is a vertical section on line 2 2, Fig. 1. Fig. 3 is a plan, partly in horizontal section, on line 3 3, Fig. 1, showing the clamps and the series of adjustable fingers. Fig. 4 is an enlarged vertical section through one of the clamps and fingers, showing also part of the steam-chamber and die and the position of the shoe during vulcanization of the rubber. Fig. 5 is a detailed section on line 5 5, Fig. 4. Fig. 6 is a perspective view of one of the fingers detached.

A represents the frame of the machine, mounted on the supporting-legs B.

C is a vertical shaft carrying at foot a last or shoe-form D. This last is pivoted at $d$ to the foot of the shaft, a central shank thereon extending up into a recess in the lower portion of the shaft. An adjusting-frame E, secured to the lower portion of the shaft, carries two adjusting-screws $e$, Fig. 1, arranged to press against the shank of the last D to throw it forward or back on its pivot $d$, so as to adjust the position of the last and shoe upon the rubber. Downward pressure upon the shaft, last, and shoe are given by the screw F, Fig. 1. I provide also for adjusting the shaft and pressure-screw laterally, so as to bring the last D in the exact position required with relation to the die. The means for accomplishing this are shown in Figs. 1 and 2. The shaft C has its vertical movement in a guide G, formed integral with a horizontal top plate G', Fig. 2, such plate engaging the screw F and being adjustable horizontally in the recessed head of the machine by means of the screws $g$, Figs. 1 and 2, which move the guide and shaft together laterally, space being allowed for the necessary movement of said screw and plate. The shaft C moves between the downwardly-extending guides of Fig. 1, its upper section being a detachable or pivoted block $c$, which can be swung aside, so that the shaft may be slightly raised without materially changing the position of screw F. (See Figs. 1 and 2.) A straight rack is formed on one side of the shaft and a pinion H, provided with a crank, serves to raise the shaft sufficiently to remove one shoe and apply another when desired. A plate I, bolted to the edges of the guide G, keeps the shaft in place.

J J are side clamps of the machine, pivoted to the base-piece K and adapted to be drawn downwardly by a pressure-screw L at the foot of the machine. The upper portion of each clamp conforms generally to the outline of one side of a mold or shoe. This upper portion of each clamp is recessed to receive the series of adjustable fingers M, which at their front or inner ends are beveled, thinned, and made to fit the space between the upper and welt of the shoe, so as when placed in position to rest on the welt in close proximity to the upper. (See Fig. 4.) These fingers are adjustable forward and back by means of screws N, threaded through the walls of the clamp, or nuts $n$, secured thereon, such screw being shown in Fig. 4 as provided with a head serving to push forward and draw back the finger M. Each finger is recessed on its under side to fit upon a longitudinal guide O in the carrying-plate J', so that it has a substantially radial movement, as will be understood from Figs. 4, 5, and 6. A vertical pressure-screw P, Fig. 4, may press downwardly upon each finger near its tip, a relieving-spring Q beneath it serving to raise the finger when the pressure is relaxed. The plate J' is shown in Figs. 4 and 5 as bolted to the upright part of the clamps. The two clamps or carriers J J' and their series of adjustable fingers N thus constitute an expansible and contractible clamping-head, serving to hold the shoe-welt down upon the rubber R in the mold, located over the steam-chamber S, (see Figs. 2 and 4,) the devices adapting the machine to act upon boots and shoes varying considerably in size and width. The two members J of this head have projecting lugs T at top drawn and held together by thumb-screws U, Figs. 1 and 3.

I claim as my invention—

1. In a machine for applying rubber soles to the bottoms of leather shoes, a mold to receive and shape the rubber and a vertical shaft carrying the shoe-last, in combination with a guide for such shaft, an adjustable plate integral with said guide, and means for adjusting such plate, guide and shaft, substantially as set forth.

2. In a machine for applying rubber soles to the bottoms of leather shoes, the frame supporting a sole-shaped mold, and a vertically-movable shaft carrying a last or form with mechanism to press the shoe thereon upon the rubber in said mold, in combination with a vertical guide in which said shaft moves and a rotatable pinion engaging a rack on such shaft, the top section of said shaft being adapted to be moved temporarily out of the line of pressure, and restored thereto, substantially as set forth.

3. In a machine for applying rubber soles to the bottoms of leather shoes, a sole-shaped mold and a steam-chamber for vulcanizing the rubber in said mold, in combination with a shaft and pressure mechanism for holding the shoe in position, a series of adjustable fingers bearing at tips upon the upper surface of the welt or sole at the line of the inseam, and with means for applying downward pressure to said fingers collectively, substantially as set forth.

4. In a machine for applying rubber soles to the bottoms of leather shoes, a sole-shaped mold and a steam-chamber for vulcanizing the rubber in said mold, in combination with movable clamps or carriers conforming generally at their edges to the sides of the shoe, a series of adjustable fingers mounted on said clamps or carriers and adapted to bear at tips upon the upper surface of the welt or sole at the line of the inseam, and with means of applying downward pressure upon such fingers collectively, substantially as set forth.

5. In a machine for applying rubber soles to the bottoms of leather boots and shoes, a steam-chamber, a sole-shaped mold covering said chamber and means for holding a shoe in position upon a rubber compound in said mold, in combination with an expansible and contractible clamping-head for the shoe edges, such head having a connected series of fingers adapted to bear at tips upon the upper surface of the welt or sole at the line of the inseam, such fingers being made separately adjustable and thereby adapted for use on shoes of various sizes, substantially as set forth.

6. In a machine for applying rubber soles to the bottoms of leather boots and shoes, a steam-chamber, a sole-shaped mold covering said chamber, and means for holding a shoe in position upon a rubber compound in said mold, in combination with an expansible and contractible clamping-head surrounding said mold and provided with a succession of adjustable fingers each having a longitudinal guide and an adjusting-screw regulating its movement, substantially as set forth.

7. In a machine for applying rubber soles to the bottoms of leather boots and shoes, a steam-chamber, a sole-shaped mold covering said chamber and means for holding a shoe in position thereon, in combination with an adjustable clamping-head formed of two hinged members furnished with locking means, each member carrying a series of contiguous, radially-adjustable fingers adapted to bear along the inseam of shoes of various widths and sizes and hold the welt down upon the rubber sole during vulcanization, substantially as set forth.

8. In a machine for applying rubber soles to the bottoms of leather boots and shoes, a sole-shaped mold, a steam-chamber for vulcanizing the rubber in said mold, and adjustable means for securing the shoe in position upon the rubber during vulcanization, in combination with an expansible and contractible clamping-head surrounding such mold, a series of radially-movable fingers adapted to press the welt downwardly upon such rubber, and with longitudinal and vertical adjusting-screws for said fingers and a retracting-spring, substantially as set forth.

In testimony whereof I have affixed my signature in presence of two witnesses.

GEORGE F. BUTTERFIELD.

Witnesses:
A. H. SPENCER,
MARGARET C. POWER.